United States Patent
Yoon et al.

(10) Patent No.: US 9,811,510 B2
(45) Date of Patent: Nov. 7, 2017

(54) METHOD AND APPARATUS FOR SHARING PART OF WEB PAGE

(71) Applicant: Samsung Electronics Co., Ltd, Gyeonggi-do (KR)

(72) Inventors: Piljoo Yoon, Gyeonggi-do (KR); Doosuk Kang, Gyeonggi-do (KR); Kwangbin Lee, Gyeonggi-do (KR); Jeehye Jung, Seoul (KR); Bokun Choi, Seoul (KR); Minkyung Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 216 days.

(21) Appl. No.: 14/172,719

(22) Filed: Feb. 4, 2014

(65) Prior Publication Data

US 2014/0223285 A1   Aug. 7, 2014

(30) Foreign Application Priority Data

Feb. 4, 2013   (KR) .................. 10-2013-0012209

(51) Int. Cl.
*G06F 17/00*   (2006.01)
*G06F 17/22*   (2006.01)
(Continued)

(52) U.S. Cl.
CPC ...... *G06F 17/2247* (2013.01); *H04M 7/0027* (2013.01); *G06F 3/0481* (2013.01);
(Continued)

(58) Field of Classification Search
CPC .. G06F 17/227; G06F 17/2264; G06F 17/211; G06F 9/4443; G06F 3/0481;
(Continued)

(56) References Cited

U.S. PATENT DOCUMENTS

2009/0313304 A1* 12/2009 Goodger ........... G06F 17/30896
2012/0105309 A1*  5/2012 Kamachi ............. H04L 12/1822
                                                              345/1.3
(Continued)

FOREIGN PATENT DOCUMENTS

KR   2010-0000267 A   1/2010
KR   2011-0005013 A   1/2011
(Continued)

OTHER PUBLICATIONS

International Search Report dated May 23, 2014 in connection with International Application No. PCT/KR2014/000940, 3 pages.
(Continued)

*Primary Examiner* — Quoc A Tran

(57) ABSTRACT

A mobile terminal for sharing a part of a web page provided. The mobile terminal comprises a communication unit configured to receive data on the web page from a network, a display unit configured to display a partial region of a web page of the received web page, and a control unit configure to obtain an address of the web page and information on the partial region and cause the communication unit to send the address and the area information to another terminal. A method for sharing a part of a web page is provided. The method comprises receiving address information on a web page and position information on a partial region of the web page, determining the partial region of the web page of the web page based on the address information and the position information, and displaying the determined partial region of the web page.

25 Claims, 9 Drawing Sheets

(51) Int. Cl.
*H04M 7/00* (2006.01)
*G06F 17/30* (2006.01)
*G06F 17/21* (2006.01)
*G06F 3/0487* (2013.01)
*G06F 3/0481* (2013.01)
*G06F 9/44* (2006.01)
*G06F 3/0482* (2013.01)

(52) U.S. Cl.
CPC .......... *G06F 3/0482* (2013.01); *G06F 3/0487* (2013.01); *G06F 9/4443* (2013.01); *G06F 17/211* (2013.01); *G06F 17/227* (2013.01); *G06F 17/2229* (2013.01); *G06F 17/2264* (2013.01); *G06F 17/3089* (2013.01); *G06F 17/30864* (2013.01); *G06F 17/30873* (2013.01); *G06F 17/30899* (2013.01); *G06F 17/30905* (2013.01)

(58) Field of Classification Search
CPC .. G06F 3/0482; G06F 3/0485; G06F 3/04842; G06F 3/0487; G06F 3/0483; G06F 17/2247; G06F 14/25–14/27; G06F 17/2229; G06F 17/30873; G06F 17/30905; G06F 17/3089; G06F 17/30899; H04M 67/02; H04M 67/10; H04M 1/72561; H04M 1/2561

USPC ........ 715/808, 234–247, 715, 800, 202–204, 715/796
See application file for complete search history.

(56) References Cited

U.S. PATENT DOCUMENTS

| 2012/0151383 | A1* | 6/2012 | Kazan .................. G06Q 10/101 715/753 |
| 2012/0173988 | A1  | 7/2012 | Tran et al. |
| 2013/0238724 | A1* | 9/2013 | Cunningham .......... H04L 51/24 709/206 |
| 2014/0122995 | A1* | 5/2014 | Beckmann .......... G06F 17/3089 715/234 |

FOREIGN PATENT DOCUMENTS

KR  2011-0021171 A  3/2011
KR  2012-0101217 A  9/2012

OTHER PUBLICATIONS

European Search Report dated Aug. 31, 2017 in connection with European Patent Application No. 14 15 3852.

* cited by examiner

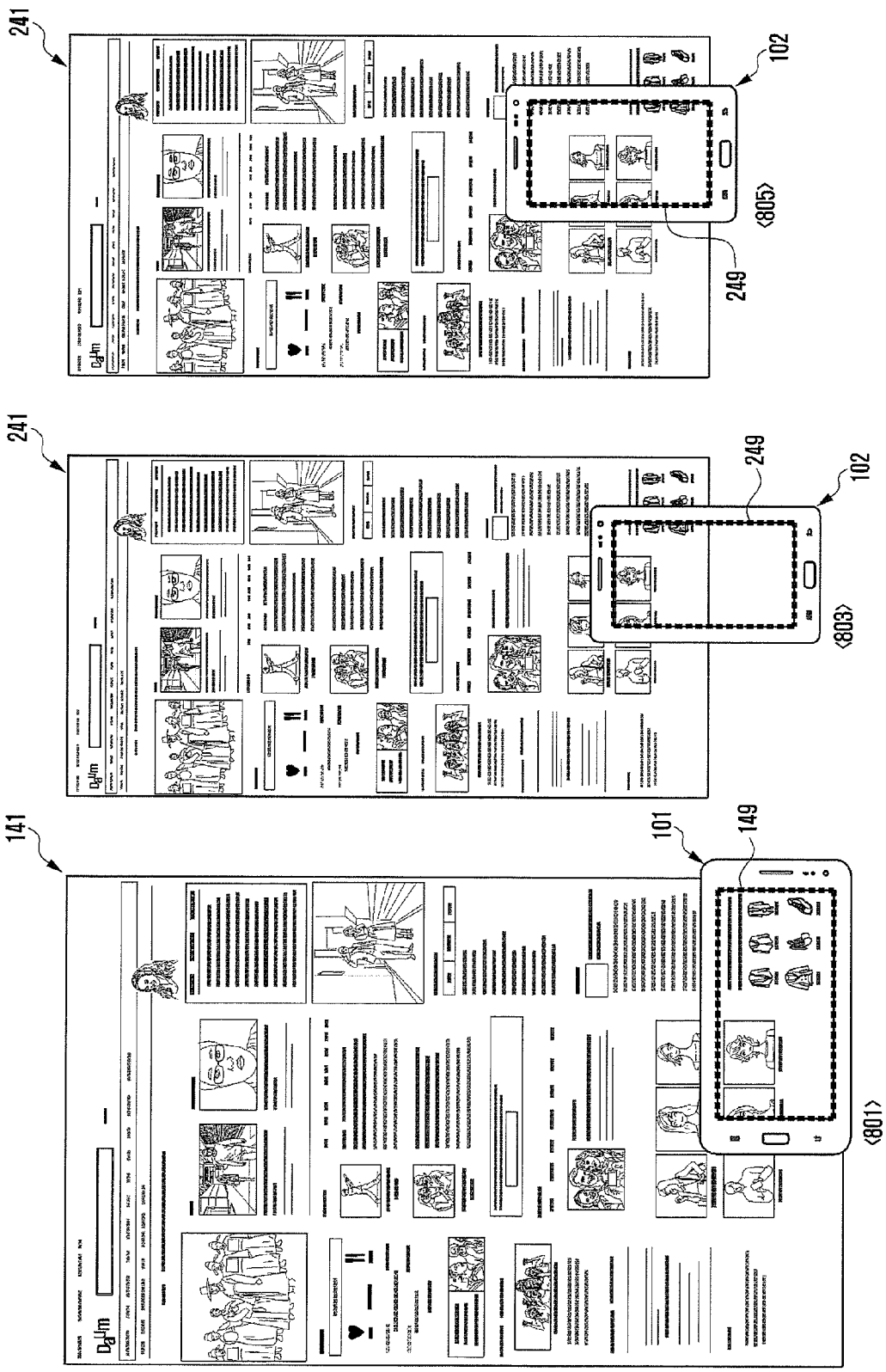

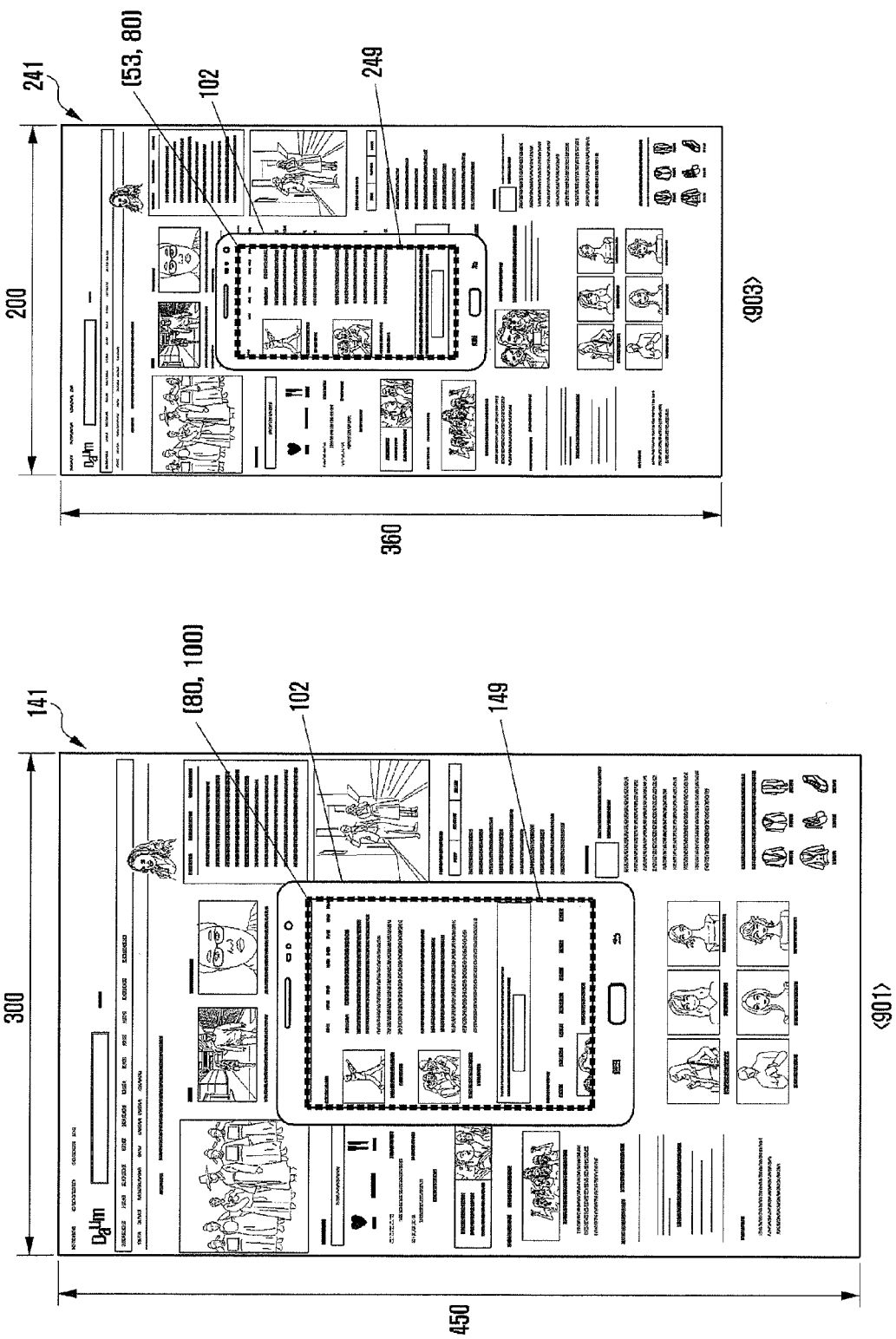

METHOD AND APPARATUS FOR SHARING PART OF WEB PAGE

CROSS-REFERENCE TO RELATED APPLICATION(S) AND CLAIM OF PRIORITY

The present application is related to and claims the benefit under 35 U.S.C. §119(a) of a Korean patent application No. 10-2013-0012209 filed on Feb. 4, 2013 in the Korean Intellectual Property Office, the entire disclosure of which is hereby incorporated by reference.

TECHNICAL FIELD

The present disclosure relates to sharing of a web page between mobile terminals. More particularly, the present disclosure relates to a web page sharing method and system and mobile terminals supporting the same wherein a sender terminal may send exact position information of a currently displayed webpage to a receiver terminal so that page information can be more accurately shared.

BACKGROUND

Mobile terminals supporting communication have entered into widespread use due to their small size enabling ease of portability. Recently, increased touchscreen sizes, and hardware and software support enabling digital content diversification have dramatically accelerated popularization of mobile terminals.

Such a mobile terminal may provide various types of content through a display unit. In particular, through a web access function, the mobile terminal may connect to a web server on the Internet and present contents of a web page provided by the web server on the display unit. Recently, web access functions have been widely used as an essential function for many users in various environments.

Meanwhile, the user of a sender terminal viewing a webpage through the web access function may want to share contents of the webpage with another user of a receiver terminal. For example, the sender user may find an interesting information element in a webpage and want to share the information element with another user. To share contents of a webpage through an existing web access function, the user of the sender terminal may copy address information of the webpage and send the same to the receiver terminal. In this case, the receiver user using only the received address information may view not the information element found by the sender user but a default region of the webpage at first.

That is, the receiver user may have to search the webpage for the information element to be viewed from the default region. When the information element is presented too small, the receiver user may have difficulty in finding the information element in the webpage. As such, the sender user may have to provide additional information for exact search to the receiver user through a voice call or text message.

SUMMARY

To address the above-discussed deficiencies, it is a primary object to provide a web page sharing method and system and mobile terminals supporting the same wherein the sender user of a sender terminal and the receiver user of a receiver terminal may share exact position information in a webpage to be shared.

A mobile terminal for sharing a part of a web page provided. The mobile terminal comprises a communication unit configured to receive data on the web page from a network, a display unit configured to display a partial region of a web page of the received web page, and a control unit configure to obtain an address of the web page and information on the partial region and cause the communication unit to send the address and the area information to another terminal.

In certain embodiments, the control unit is configured to collect information on a size of the whole web page and coordinate information of the partial region of the web page.

In certain embodiments, the control unit is configured to generate a virtual anchor for displaying the partial region of the web page.

In certain embodiments, the control unit is configured to collect tag ID information of an information element arranged at a topmost portion of the web page and coordinate information of a position in the partial region of the web page output on the display unit as the position information.

In certain embodiments, the control unit is configured to collect tag ID information included in the partial region of the web page as the position information.

In certain embodiments, the control unit is configured to send display orientation information of the partial region of the web page indicating landscape mode or portrait mode as part of the position information.

In certain embodiments, the control unit is configured to collect tag ID information associated with an information element specified by an input event among multiple information elements contained in the partial region of the web page as the position information.

In certain embodiments, the control unit is configured to extract at least a portion of text data contained in the partial region of the web page as a search key word.

In certain embodiments, the control unit is configured to collect capture information on the partial region of the web page as the position information.

A mobile terminal for sharing a part of a web page is provided. The mobile terminal comprises a communication unit configured to receive address information of the web page and position information on a partial region of the first web page, a control unit configured to control the communication unit to access the web page by utilizing the address information and determine a partial region to display, of the web page by utilizing the position information, and a display unit configured to display the partial region of the web page.

In certain embodiments, when the received position information contains a size and coordinate information of the region to display, of the web page, the control unit is configured to display the partial region on the display unit by applying the ratio between the size of the first web page and the size of the second web page to the coordinate information.

In certain embodiments, when the received position information contains tag ID information contained in the region to display, the control unit is configured to searches the web page for the tag ID information and cause the display unit to display the partial region containing an information element associated with the tag ID information on the display unit.

In certain embodiments, when the received position information includes at least a portion of text information, the control unit is configured to cause the display unit to display the partial region containing the portion of text information.

In certain embodiments, when the received position information includes capture information of the partial region of the web page, the control unit is configured to display the partial region matching the capture information on the display unit.

A method for sharing a part of a web page in a mobile terminal is provided. The method comprises receiving a web page, displaying a partial region of the web page of the received web page, collecting address information of the web page and position information of the partial region of the web page thereof, and sending the address information and position information to another terminal.

A method for sharing a part of a web page is provided. The method comprises receiving address information on a web page and position information on a partial region of the web page, determining the partial region of the web page of the web page based on the address information and the position information, and displaying the determined partial region of the web page.

In a feature of the present disclosure, when the user of a sender terminal specifies a position in a web page, the web page sharing method and system enable the user of a receiver terminal to view the web page at the same position.

Additionally, the present disclosure enables sharing of position information in a web page through simple information transfer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates additional screen representations for web page sharing according to an embodiment of the present disclosure.

FIG. 9 illustrates further screen representations for web page sharing according to an embodiment of the present disclosure.

DETAILED DESCRIPTION

Figure 1:
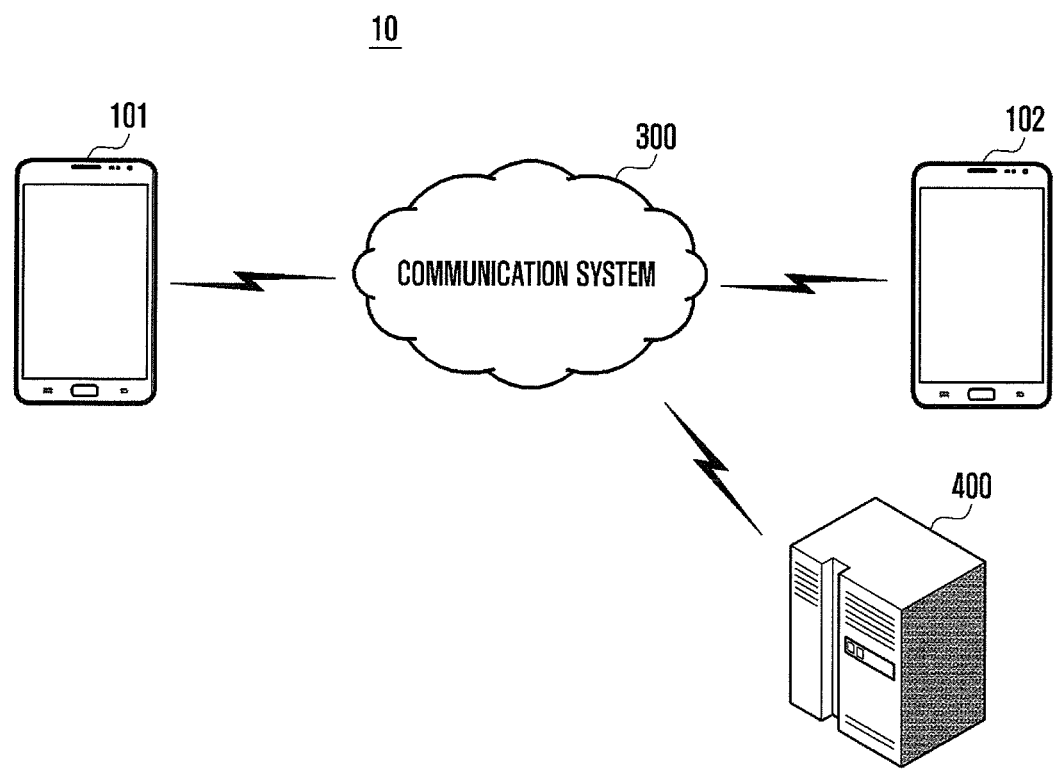
FIG. 1 illustrates a high-level architecture of a web page sharing system according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, embodiments of the present disclosure are described in detail with reference to the accompanying drawings.

Detailed descriptions of well-known functions and structures incorporated herein may be omitted to avoid obscuring the subject matter of the present disclosure. Detailed descriptions of components having substantially the same configurations and functions may also be omitted.

In the drawings, some elements are exaggerated or only outlined in brief, and thus may be not drawn to scale. The present disclosure is not limited by relative sizes of objects and intervals between objects in the drawings.

FIG. 1 illustrates a high-level architecture of a web page sharing system 10 according to an embodiment of the present disclosure.

Referring to FIG. 1, the web page sharing system 10 of the present disclosure can include a sender terminal 101, a receiver terminal 102, a web page providing server 400, and a communication system 300. In the web page sharing system 10 having the above configuration, the sender terminal 101 can connect to the web page providing server 400 and receive a web page therefrom and output the web page on a display unit. In this process, the web page sharing system 10 enables the sender terminal 101 to obtain information on the unique address of the web page and information on the position of the currently displayed portion of the web page on the display unit. Thereafter, the web page sharing system 10 enables the sender terminal 101 to send the unique address information of the web page and the position information thereat to the receiver terminal 102. Then, the receiver terminal 102 can receive a web page indicated by the received address information from the web page providing server 400 and output the received web page from the portion corresponding to the received position information on a display unit. Accordingly, the web page sharing system 10 enables the sender terminal 101 to provide exact position information of a portion of a web page currently viewed by the sender user to the receiver terminal 102, which can then output the same portion of a web page as that viewed by the sender user. Thereby, the receiver user can view the same content as that viewed by the sender user without additional navigation action on the web page. The web page sharing system 10 enables the receiver user of the receiver terminal 102 to readily identify an information item or content arranged at a particular position of a web page currently viewed by the sender user of the sender terminal 101, facilitating rapid interaction between users such as gift requesting or information checking.

The sender terminal 101 can access the communication system 300 through a communication unit and connect to the web page sharing system 10 via the communication system 300. Thereafter, in response to an input signal from an input unit or display unit acting as an input means, the sender terminal 101 can receive a web page from the web page providing server 400 and output the web page on the display unit. Here, the web page can be one of various types of pages such as a webpage provided by a server apparatus and a page provided by a cloud system.

In response to generation of a user input event, the sender terminal 101 can obtains information on the unique address of a web page currently output on the display unit and information on the position of a currently displayed portion of the web page on the display unit. In response to a user request, the sender terminal 101 can send the unique address information of the web page and the position information thereat to the receiver terminal 102 through the communication system 300.

The receiver terminal 102 can camp on the communication system 300 and can utilize the unique address information of a web page and the position information thereat provided by the sender terminal 101 to reproduce a state corresponding to a state wherein the web page is output on the display unit of the sender terminal 101. To this end, the receiver terminal 102 can connect to the web page providing server 400 using the received unique address information and receives a web page indicated by the unique address information from the web page providing server 400. The receiver terminal 102 outputs the received web page on the display unit so that a portion of the web page corresponding to the received position information can be viewed. Hence, according to a request from the sender terminal 101, the receiver terminal 102 can display a portion of a web page identical to the portion of the web page that is or was displayed on the sender terminal 101.

The web page providing server 400 is connected to the communication system 300 and provides a web page to the sender terminal 101 and receiver terminal 102 upon request. The web page providing server 400 maintains a variety of web pages developed in advance and provides a requested web page to the sender terminal 101 or the receiver terminal 102 through the communication system 300. The web page providing server 400 can register its unique address such as a web address in the communication system 300 and can provide a web page to the sender terminal 101 or receiver terminal 102 accessing the registered unique address. The web page providing server 400 can require authentication in the access procedure according to design. A web page provided by the web page providing server 400 can include identification information for identifying the web page providing server 400 and identification information for identifying the web page itself. A web page can contain a variety of information elements, contents or items. For example, a web page can contain text, images, videos and audios arranged in a particular form. When a web page is a webpage, it can be written in HyperText Markup Language (HTML). In this case, each information element can have tag information, which can include tag ID information. Each information element can have source information, which can be composed of tag information.

The communication system 300 is arranged between the sender terminal 101 and receiver terminal 102 and is configured to establish a communication channel between the sender terminal 101 and receiver terminal 102. The communication system 300 can include various types of network instruments according to characteristics of the sender terminal 101 and receiver terminal 102. When the sender terminal 101 and receiver terminal 102 support mobile communication, the communication system 300 can be a mobile communication system supporting mobility. For example, the communication system 300 can be composed of various network devices supporting 2G, 3G or 4 G communication schemes and techniques. The communication system 300 can establish communication channels between the sender terminal 101, receiver terminal 102 and web page providing server 400. The communication system 300 enables the web page providing server 400 to provide web pages to the sender terminal 101 and receiver terminal 102.

It can be understood that the communication system 300 can be composed of various network instruments, such as a network device enabling the sender terminal 101 to send unique address information of a web page and position information thereat to the receiver terminal 102, and a network device enabling the receiver terminal 102 to connect to the web page providing server 400 and to receive a web page containing various information elements.

As described above, the web page sharing system 10 permits the receiver terminal 102 to obtain information on the position of a portion of a web page displayed on the sender terminal 101, enabling exact and elaborate sharing of information. Next, sharing of a web page is described in more detail.

Figure 2:
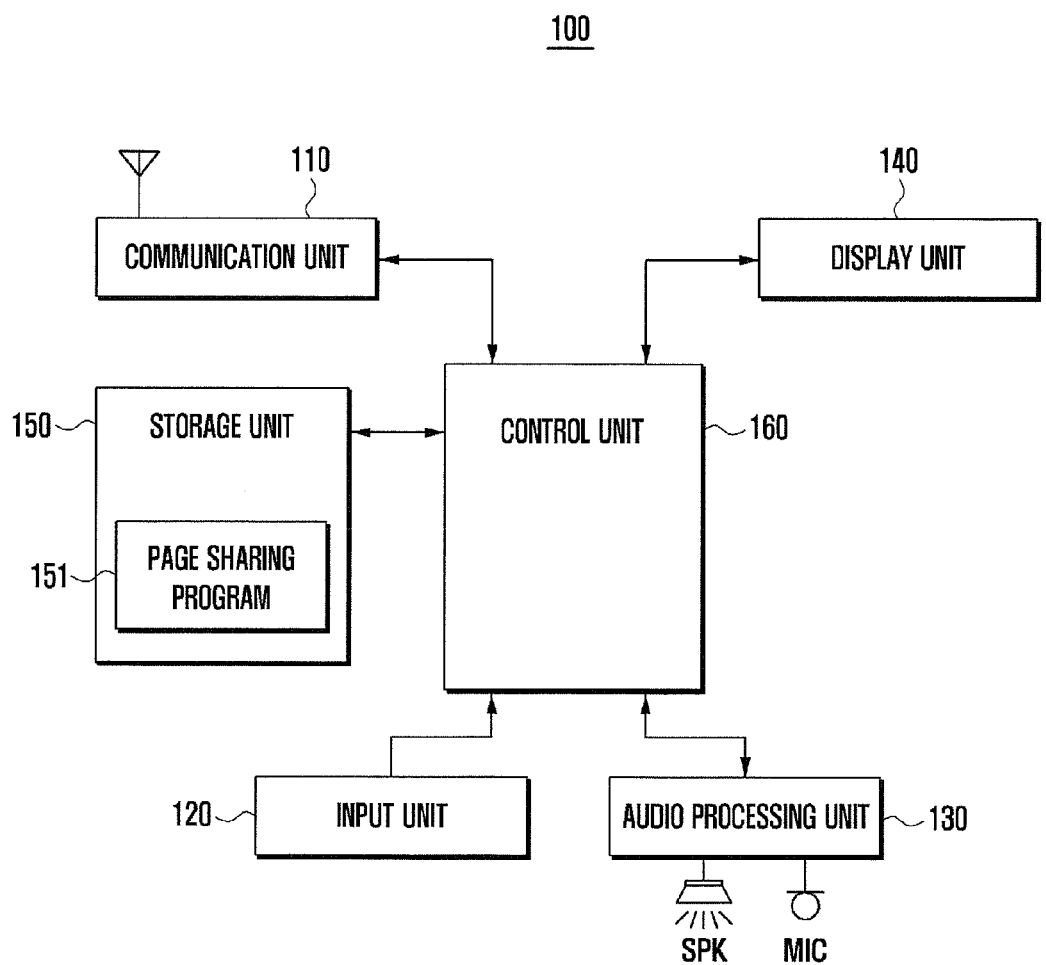
FIG. 2 is a block diagram of a mobile terminal for sharing a part of web page according to an embodiment of the present disclosure.

FIG. 2 is a block diagram of a mobile terminal 100 in the web page sharing system 10 according to an embodiment of the present disclosure. The mobile terminal 100 can support both a sender-side function and a receiver-side function. The sender-side function is primarily described and the receiver-side function is also described as necessary. In the following description, the mobile terminal 100 can function as a sender terminal or as a receiver terminal according to situations.

Referring to FIG. 2, the mobile terminal 100 can include a communication unit 110, an input unit 120, an audio processing unit 130, a display unit 140, a storage unit 150, and a control unit 160.

For web page sharing as a sender, the mobile terminal 100 having the above configuration can receive a specific web page from a web page providing server 400 according to an input event generated by the input unit 120 or the display unit 140 acting as input means. The mobile terminal 100 can output the received web page on the display unit 140 and check whether an input event for web page sharing is generated. When an input event for web page sharing is generated, the mobile terminal 100 obtains unique address information of the web page currently output on the display unit 140 and position information of a currently displayed portion of the web page. The unique address information and position information can be delivered to a receiver terminal specified by the user in an automatic fashion or after user consent. For web page sharing as a receiver, the mobile terminal 100 can receive unique address information of a web page and position information thereat from a sender terminal, connect to the web page providing server 400 using the received information, receive a web page corresponding to the unique address information from the web page providing server 400, and output the received web page so that a portion of the web page corresponding to the position information is displayed on the display unit 140.

To this end, the communication unit 110 can establish a communication channel to the web page providing server 400 through the communication system 300. In response to a user input event, the communication unit 110 can send a request message for a web page to the web page providing server 400 and receive the web page from the web page providing server 400. The received web page can be output on the display unit 140 under control of the control unit 160. The communication unit 110 can establish a data communication channel to receive a web page and receive data of the web page through the data communication channel. Here, the data communication channel can be one of various communication channels such as a Wi-Fi communication channel and a 3G or 4 G communication channel.

A web page received by the communication unit 110 can have unique address information, and each information element contained in the web page can have tag information. Here, the unique address information can be webpage address information such as URL information. Hence, in response to an input event for sharing a portion of a web page, the communication unit 110 can send unique address information of the web page and position information of a currently displayed portion of the web page to a receiver terminal. To send such information, the communication unit 110 can operate various types of channels such as text message channel and instant message channel.

When the mobile terminal 100 functions as a receiver terminal, the communication unit 110 can receive unique address information of a web page and position information thereat from another terminal. The received unique address information and position information are forwarded to the control unit 160. Under control of the control unit 160, the communication unit 110 can connect to the web page providing server 400, receive a web page from the web page providing server 400 and forward the received web page to the control unit 160.

The input unit 120 is configured to generate various input signals for manipulation of the mobile terminal 100. The input unit 120 can include specific keys such as a button key, side key and home key, and further include a virtual touch pad to support a full touchscreen feature. Here, the virtual touch pad can be displayed on the display unit 140 to generate an input signal corresponding to a user touch gesture.

For a sender-side function in web page sharing, the input unit 120 can generate an input signal for connecting to the web page providing server 400, an input signal for making a web page request, and an input signal for navigation on a received web page. Particularly, in a state wherein a portion of the web page is output on the display unit 140, the input unit 120 can generate an input signal for activating web page sharing so as to make a request to another terminal to share information on the position of the currently displayed portion of the web page.

For a receiver-side function in web page sharing, the input unit 120 can generate an input signal for examining presence of unique address information of a web page and position information thereat sent from another terminal. This input signal for examination may be not used according to design. For example, during an instant messaging session, the mobile terminal 100 can examine presence of unique address information of a web page and position information thereat sent from another terminal by default and can automatically connect to the web page providing server 400 to receive the web page. The input unit 120 can generate an input signal for storing the unique address information of a web page and position information thereat according to user control.

The audio processing unit 130 is configured to process various audio signals generated in the course of operating the mobile terminal 100. For example, the audio processing unit 130 can include a speaker SPK to output an audio signal generated or decoded by the mobile terminal 100, and include a microphone MIC to collect an audio signal for a voice or video call or recording. When audio content is contained in a web page and scheduling information or an input event is present for playback of the audio content, the audio processing unit 130 can produce a corresponding audio signal. In particular, according to generation of an input event for selecting web page sharing, the audio processing unit 130 can output a sound effect or notification indicating success or failure of obtaining unique address information of a web page and current position information thereat and transmitting the same to another terminal. The audio processing unit 130 can skip generation of a sound effect or notification according to user settings.

The display unit 140 is configured to output various functional screens needed for usage of the mobile terminal 100. For example, the display unit 140 can provide a variety of screens related to settings and functions provided by the mobile terminal 100, such as a menu screen, multi-icon screen, multi-widget screen, standby screen and lock screen. In particular, the display unit 140 can output a screen for accessing the web page providing server 400, output a screen for outputting a web page from the web page providing server 400, output a screen for navigating the web page according to input events, and output a screen for guiding collection and transmission of unique address information of the web page and current position information thereat according to activation of web page sharing. For a receiver-side function, the display unit 140 can output a screen for guiding reception of unique address information of a web page and position information thereat sent from another terminal, output a screen for connecting to the web page providing server 400 using the unique address information by default or according to user consent, output a screen for receiving a web page indicated by the unique address information from the web page providing server 400 and displaying the web page. Here, the displayed portion of the received web page corresponds to the current position information received from the sender terminal. Web page output screens on the sender terminal and receiver terminal are described in more detail later with reference to the accompanying screen representations.

The storage unit 150 can store a variety of data and programs needed for operation of the mobile terminal 100. For example, the storage unit 150 can store an operating system for operating the mobile terminal 100, and data sent, received, and input during operation thereof. In particular, the storage unit 150 can store a page sharing program 151 to support web page sharing of the present disclosure.

The page sharing program 151 is composed of sender-side routines and receiver-side routines for page sharing. The sender-side routines can include a routine for outputting a web page such as a web browser routine, a routine for outputting an icon or menu item to select web page sharing, a routine for obtaining unique address information of the web page currently output on the display unit 140 and position information of a currently displayed portion of the web page according to selection of the icon or menu item, and a routine for sending the obtained information to a terminal specified by the user. The sending routing can use an instant message service or a text message service to transmit the obtained information.

The receiver-side routines can include a routine for outputting unique address information of a web page and position information thereat upon reception thereof, a routine for accessing the web page providing server 400 using the received unique address information of a web page according to scheduling information or an input event, and a routine for receiving a web page corresponding to the unique address information from the web page providing server 400. Additionally, the receiver-side routines can include a routine for outputting the received web page so that a portion of the web page corresponding to the position information is displayed on the display unit 140.

The control unit 160 is configured to control signal exchange, data processing, information collection and distribution in the mobile terminal 100 for web page sharing according to an embodiment of the present disclosure. To support web page sharing, the control unit 160 can have a configuration as shown in FIG. 3.

Figure 3:
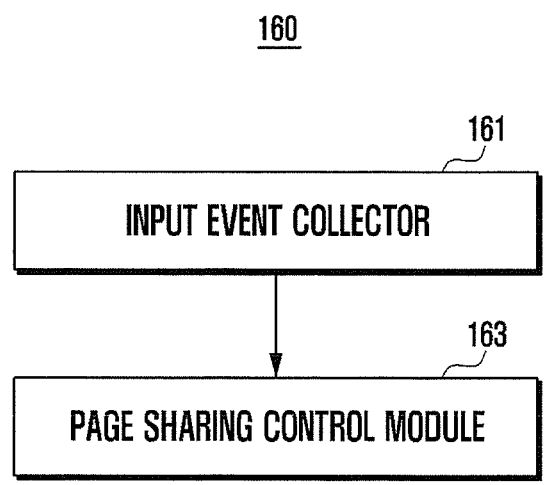
FIG. 3 illustrates a high-level configuration of a control unit in the mobile terminal of FIG. 2.

FIG. 3 illustrates a configuration of the control unit 160 in the mobile terminal 100 according to an embodiment of the present disclosure.

Referring to FIG. 3, the control unit 160 can include an input event collector 161 and a page sharing control module 163.

The input event collector 161 collects input events generated by an input means including at least one of the input unit 120 and the display unit 140 supporting an input function. In particular, for a sender-side function, the input event collector 161 can collect input events for selecting and executing the web page sharing function of the present disclosure among input events generated by the input means. To this end, when the web page providing server 400 is accessed, the input event collector 161 can output an icon or menu item for sharing a web page provided by the web page providing server 400. The input event collector 161 can also set a specific button key of the input unit 120 as a shortcut key for the web page sharing function. When an input event for selecting the icon, menu item or shortcut key is collected, the input event collector 161 can forward the input event to the page sharing control module 163.

For a receiver-side function, when a message requesting web page sharing is received, the input event collector 161 can collect an input event for accepting the request and forward the collected input event to the page sharing control module 163. If an input event for rejecting the request is collected, the input event collector 161 can ignore the web page sharing request and send a message indicating rejection of the web page sharing request to the corresponding sender terminal.

The page sharing control module 163 supports the web page sharing function according to input events received from the input event collector 161. When an input event for activating the web page sharing function is received from the input event collector 161, the page sharing control module 163 obtains unique address information of a web page currently output on the display unit 140 and position information of a currently displayed portion of the web page. Here, the page sharing control module 163 can obtain information on the start position of the currently displayed portion of the web page as position information. For example, the page sharing control module 163 can obtain coordinate information of a portion of the web page displayed at the center, upper right corner, upper right corner, or lower left corner of the display unit 140. The page sharing control module 163 can obtain unique address information such as URL information of a web page currently output on the display unit 140. To this end, the page sharing control module 163 can collect information on the web page currently output on the display unit 140 and extract URL information from the collected information.

After collection of unique address information of a web page and current position information thereat, the page sharing control module 163 can obtain information on a receiver terminal to share the web page. Here, the page sharing control module 163 can output an input window on the display unit 140 to obtain receiver terminal information from the user or collect information on a phone number, email address, instant messaging ID of a default receiver terminal. For example, when a history of using the web page sharing function is maintained, the page sharing control module 163 can select the most recently recorded mobile terminal as a default receiver terminal and collect information on the default receiver terminal. Thereafter, the page sharing control module 163 can send the unique address information of a web page and position information thereat to the receiver terminal.

For a receiver-side function, when unique address information of a web page and position information thereat are received from a sender terminal, the page sharing control module 163 can request the user to decide whether to permit use of the web page sharing function. For example, the page sharing control module 163 can output a window requesting the user to decide whether to permit use of the web page sharing function on the display unit 140. When settings are configured to as to permit use of the web page sharing function by default, the page sharing control module 163 can receive a web page using the received unique address information without output of a separate window for permission. Here, to receive a web page, the page sharing control module 163 can access the web page providing server 400 using the received unique address information.

After reception of the web page, the page sharing control module 163 can refer to the received position information at the web page and output the received web page so that a portion of the web page corresponding to the position information is displayed on the display unit 140.

Figure 4:
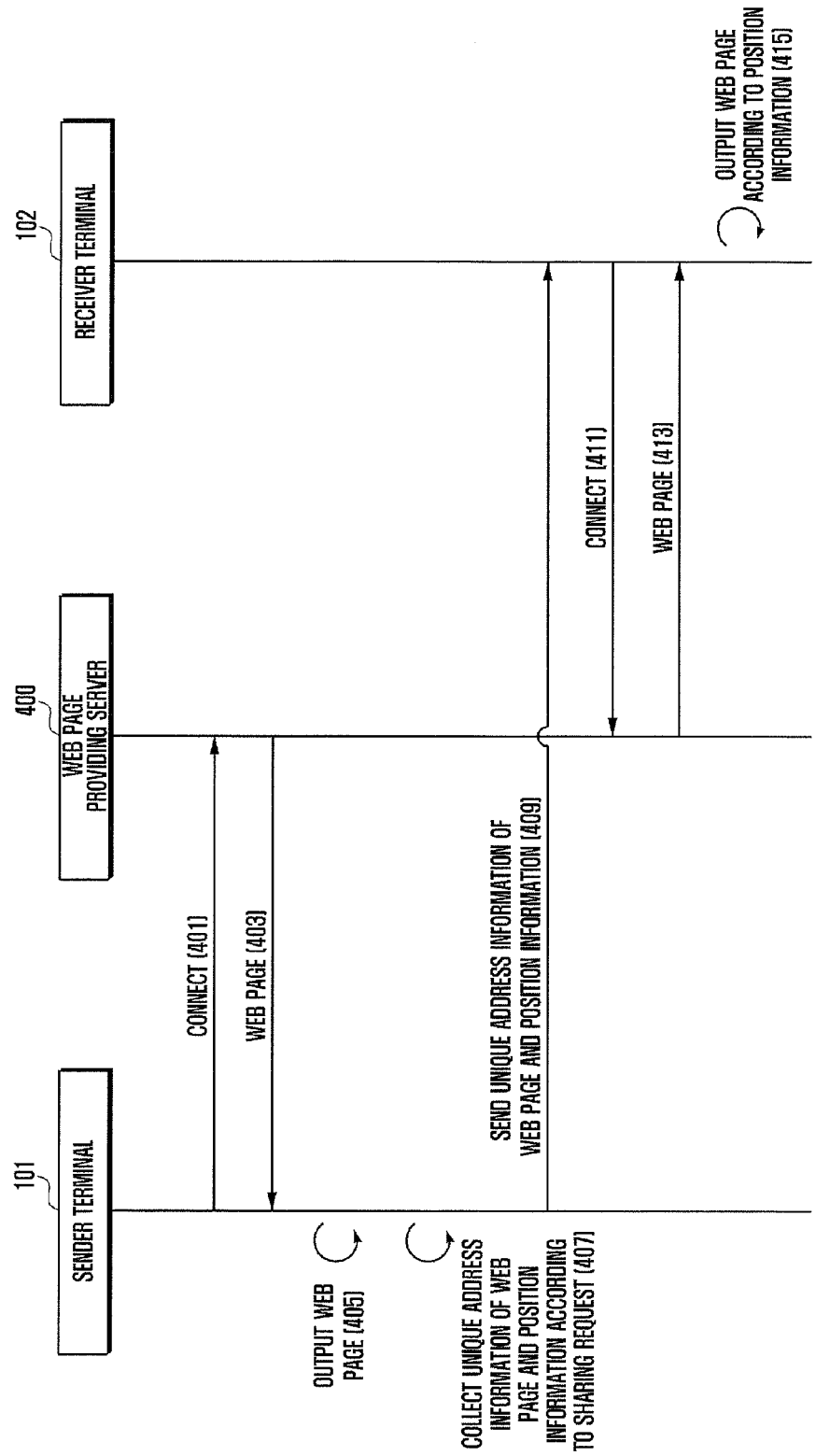
FIG. 4 is a sequence diagram illustrating signal exchange between devices in the system for web page sharing according to an embodiment of the present disclosure.

FIG. 4 is a sequence diagram illustrating signal exchange between system constituents for web page sharing according to an embodiment of the present disclosure.

Referring to FIG. 4, in the web page sharing system of the present disclosure, at operation 401, the sender terminal 101 connects to the web page providing server 400. At operation 403, the sender terminal 101 receives a web page from the web page providing server 400. At operation 405, the sender terminal 101 outputs the received web page on the display unit 140.

Upon issuance of a sharing request, at operation 407, the sender terminal 101 obtains unique address information of the web page and position information thereat. At operation 409, the sender terminal 101 sends the unique address information of the web page and position information thereat to the receiver terminal 102.

When the unique address information of the web page and position information thereat are received from the sender terminal 101, the receiver terminal 102 permits use of the web page sharing function by default or according to user selection. At operation 411, the receiver terminal 102 connects to the web page providing server 400 using the received unique address information among the received information. At operation 413, the web page providing server 400 sends a web page corresponding to the unique address information to the receiver terminal 102. Upon reception of the web page from the web page providing server 400, at operation 415, the receiver terminal 102 outputs a portion of the web page corresponding to the position information. Here, the receiver terminal 102 can perform at least one of screen coordinate application, screen size ratio adjustment, search word application, source code or tag ID utilization, screen orientation adjustment, and capture information application so that a portion of the web page corresponding to a portion of the web page currently output on the display unit 140 of the sender terminal 101 is displayed.

Figure 5:
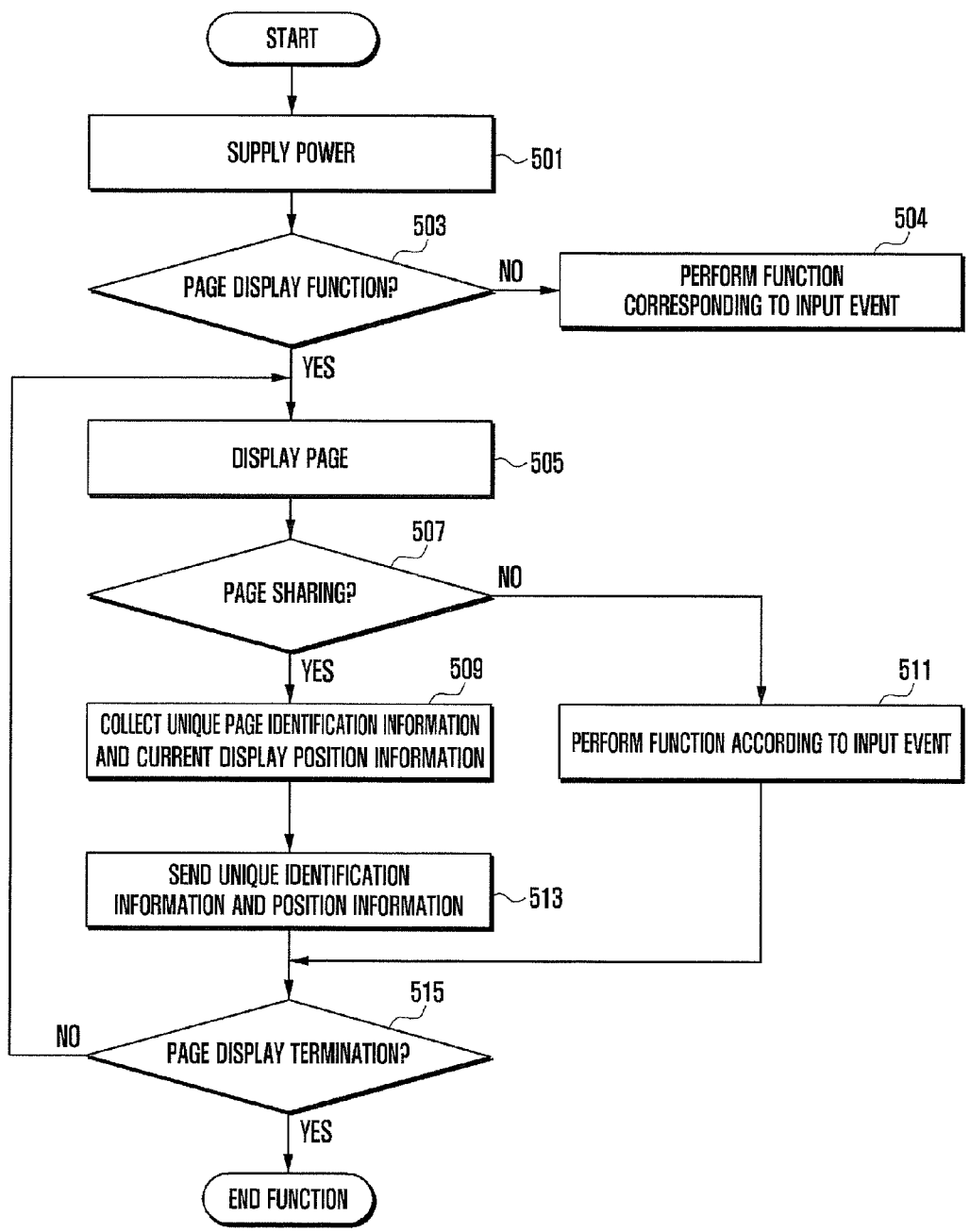
FIG. 5 is a flowchart of a procedure for web page sharing performed by a sender terminal according to an embodiment of the present disclosure.

FIG. 5 is a flowchart of a procedure for web page sharing performed by a sender terminal according to an embodiment of the present disclosure.

Referring to FIG. 5, for sender terminal operation, at operation 501, the control unit 160 of the mobile terminal 100 controls supply of power from a power source to individual components thereof. Upon reception of an input event from the input unit 120 or the display unit 140 acting as an input means, at operation 503, the control unit 160 checks whether the input event is a request for page display. Here, the control unit 160 can check whether the input event is a request for a web page provided by the web page providing server 400. If the input event is not a request for page display, the control unit 160 proceeds to operation 504 at which the control unit 160 performs a function corresponding to the input event. For example, the control unit 160 can perform broadcast reception, file playback, file editing, call handling according or the like according to the type of the input event.

If the input event is a request for page display at operation 503, the control unit 160 proceeds to operation 505 at which the control unit 160 displays a requested web page on the display unit 140. Here, the control unit 160 can connect to the web page providing server 400 through the communication system 300 and receive a web page from the web page providing server 400.

Upon generation of an input event in a state wherein the web page is displayed on the display unit 140, at operation 507, the control unit 160 checks whether the input event is a request for page sharing. To this end, for selection of the web page sharing function, the control unit 160 can output a menu item or icon on the display unit 140 or set a shortcut key. When the input event is related to selection of the menu item, icon or shortcut key, the control unit 160 proceeds to operation 509 at which the control unit 160 obtains unique address information of the web page and current position information thereat. The unique address information of a web page can be web address or URL address information. The current position information can indicate the position of a portion of the web page being currently displayed on the display unit 140 among the whole of the web page.

For position information, the control unit 160 can collect information on the size (widthwise size and lengthwise size) of the whole web page and information on the coordinates of a point in a region of the web page currently output on the display unit 140. That is, position information can correspond to coordinate information of a point in a partial region of the web page being currently displayed on the display unit 140. After obtaining coordinate information, the control unit 160 can provide a virtual anchor feature based on coordinate information according to design of the web page. To allow movement to a user specified position on a web page, a virtual anchor can be defined by "URL+#+virtual anchor (coordinates)". Here, the part following the character '#' can indicate a portion of the web page to be output on the display unit 140. When a receiver terminal receives information "URL+#+virtual anchor (coordinates)", it can receive a web page corresponding to the URL from the web page providing server 400 and decode the received web page and display a region of the web page corresponding to the coordinates subsequent to the character '#' (scroll to the corresponding region). When the coordinate information of a virtual anchor is invalid (for example, the coordinate information is unrelated with the size of the whole web page), the control unit 160 can output a region of the web page set by default on the display unit 140. When the coordinate information of a virtual anchor is valid, the control unit 160 can output a corresponding region of the web page according to schemes described later.

Meanwhile, for position information on a web page, the control unit 160 can collect source information or tag ID information of an information element contained in a partial region of the web page currently output on the display unit 140. At least one piece of tag ID information can be collected according to the size of an information element currently output on the display unit 140. For example, when the displayed information element has a size larger than that of the display unit 140, the control unit 160 can collect only one piece of tag ID information. When multiple small information elements are displayed on the display unit 140, the control unit 160 can collect one or more pieces of tag ID information. Here, as position information, the control unit 160 can collect only tag ID information of an information element displayed at a given portion of the display unit 140, tag ID information of an information element indicated by a touch event occurring on the display unit 140, or tag ID information of multiple information elements according to design. In addition, the control unit 160 can collect tag ID information of an information element arranged at the top portion of the web page and coordinate information of a position in a partial region of the web page output on the display unit 140 as position information. Instead of tag ID information, source information can be directly collected as position information of an information element according to design variation. As described before, source information can include tag ID information of at least one information element.

The control unit 160 can extract a specific phrase from the text in a partial region of the web page output on the display unit 140 as position information. To consider repetition of a word or phrase in the whole page, the control unit 160 can select text phrases including at least one of vocabularies, words, a sentence and special characters contained in the text of a partial region of the web page output on the display unit 140 as position information. In addition, the control unit 160 can obtain information on the screen orientation of the mobile terminal 100 such as portrait mode or landscape mode together with other information including tag ID information, capture information or phrase information as part of position information. To this end, the mobile terminal 100 can further include a sensor such as an acceleration sensor capable of sensing switching between the portrait mode and landscape mode.

The control unit 160 can capture at least one portion of a partial region of the web page currently output on the display unit 140 and provide the captured portion as position information. As a full screen capture causes an excessive increase in the amount of position information to be sent, the control unit 160 can subdivide the partial region of the web page output on the display unit 140 into blocks in a matrix form and capture at least one block as position information. For fast and accurate position finding, the control unit 160 can capture multiple blocks as position information.

For example, the control unit 160 can subdivide the partial region of the web page output on the display unit 140 into 9 or 16 blocks and capture blocks at a preset location such as the upper right corner block and lower left corner block or randomly selected blocks as position information. Here, the control unit 160 can capture at least one block according to user selection as position information. When the user selects blocks to be captured, the control unit 160 can highlight or mark the selected blocks for distinction from unselected blocks and capture the selected blocks with a highlight or mark as position information.

After collection of the unique address information of the web page and position information thereat, at operation 513, the control unit 160 sends the unique address information of the web page and position information thereat to the receiver terminal. Here, the control unit 160 may obtain information on the receiver terminal such as a phone number, email address, instant messaging ID and output an input window to receive such information. Here, the input window may include a search field for the phonebook.

If the input event is not a request for page sharing at operation 507, the control unit 160 proceeds to operation 511 at which the control unit 160 performs a function according to the input event. For example, the control unit 160 may move to a new partial region of the web page corresponding to the input event and output the new partial region of the web page on the display unit 140.

Thereafter, at operation 515, the control unit 160 checks whether an input event for page display termination is generated. If an input event for page display termination is generated, the control unit 160 terminates page display and performs function switching by executing a function according to preset scheduling information or returning to the previous function being executed before activation of page display. If an input event for page display termination is not generated, the control unit 160 returns to operation 505 and continues page display.

Figure 6:
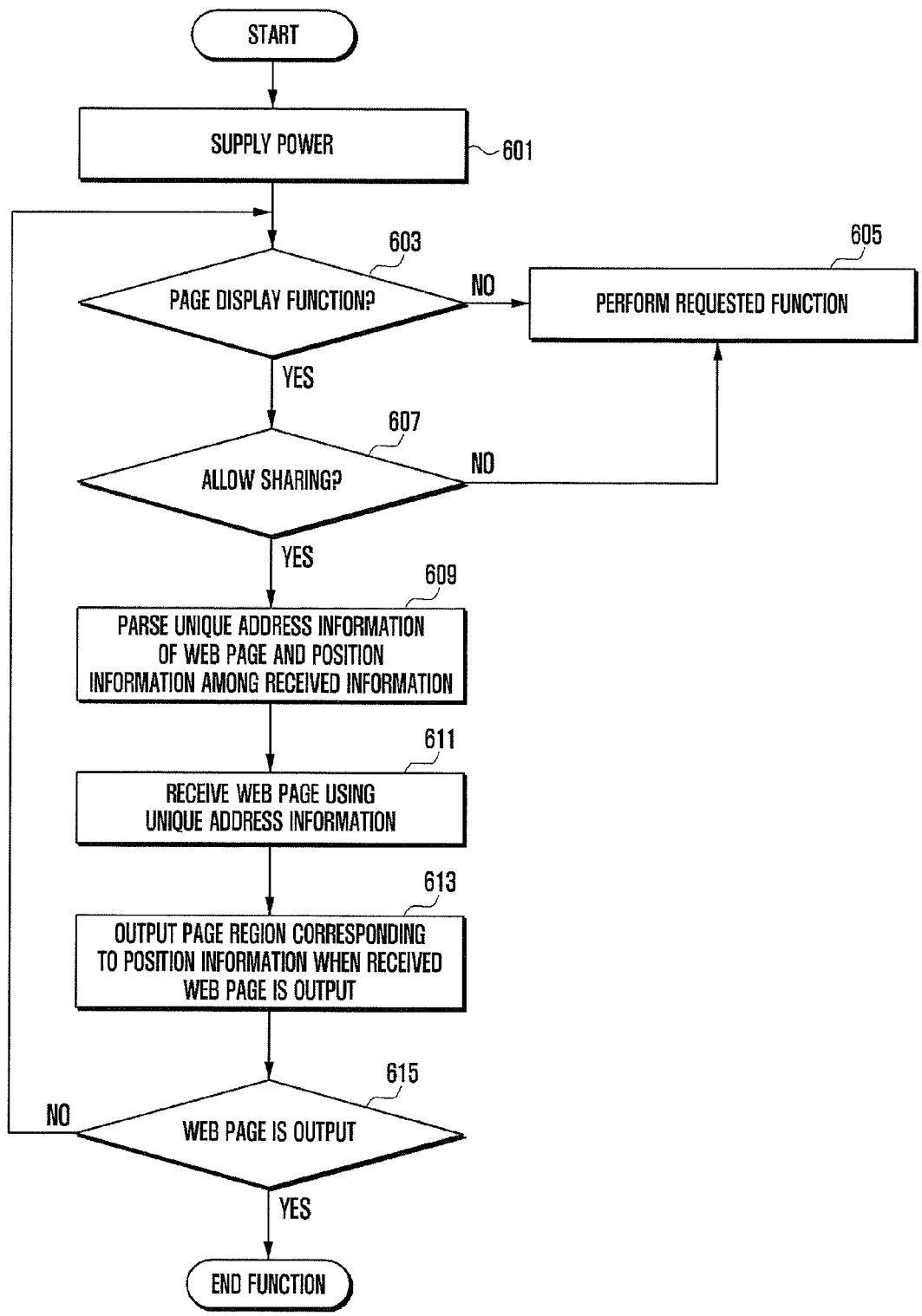
FIG. 6 is a flowchart of a procedure for web page sharing performed by a receiver terminal according to an embodiment of the present disclosure.

FIG. 6 is a flowchart of a procedure for web page sharing performed by a receiver terminal according to an embodiment of the present disclosure.

Referring to FIG. 6, for receiver terminal operation, at operation 601, the control unit 160 of the mobile terminal 100 controls supply of power from a power source to individual components thereof. In particular, the control unit 160 supplies power to the communication unit 110 to be on standby for a text or instant message or email.

At operation 603, the control unit 160 checks whether a message requesting page sharing is received. If a message requesting page sharing is not received, the control unit 160 proceeds to operation 605 at which the control unit 160 performs a function according to an input event with the communication unit 110 on standby. For example, the control unit 160 may perform a communication function, web access, file playback, file editing or the like according to an input event. When no input event is generated, the control unit 160 may enter a sleep state to support power saving mode. When an input event for termination is generated, the control unit 160 may turn off the mobile terminal 100.

If a message requesting page sharing is received, the control unit 160 proceeds to operation 607 at which the control unit 160 checks whether page sharing is allowed. When page sharing is allowed by default settings, the control unit 160 may proceed to operation 609. When page sharing is not allowed by default settings, the control unit 160 may output a popup window or message to request the user to decide whether to allow page sharing. If the user generates an input event for disallowing page sharing, the control unit 160 rejects the page sharing request and proceeds to operation 605 at which the control unit 160 performs a function according to an input event. Here, the control unit 160 may send a response message indicating rejection of the page sharing request to the sender terminal.

If page sharing is allowed by default settings or user decision at operation 607, the control unit 160 proceeds to operation 609 at which the control unit 160 extracts unique address information of a web page and position information thereat from the received information. At operation 611, the control unit 160 connects to the web page providing server 400 using the unique address information of a web page through the communication unit 110 and the communication system 300 and receives a web page corresponding to the unique address information from the web page providing server 400.

At operation 613, the control unit 160 outputs the received web page so that a portion of the web page corresponding to the position information is displayed on the display unit 140. Specifically, a web page may have different size effects according to screen sizes. That is, when the sender terminal and the receiver terminal have different screen sizes, the size of the whole web page relative to the screen size may differ in the sender terminal and the receiver terminal. Hence, when information on the size of the web page and coordinate information of a position in a displayed partial region of the web page are provided by the sender terminal, the control unit 160 may check whether the page size relative to the screen size in the sender terminal is equal to the page size relative to the screen size in the sender terminal. If the relative page sizes are equal, the control unit 160 may output the received web page so that a portion of the web page corresponding to the coordinate information is displayed on the display unit 140. If the relative page sizes are not equal, the control unit 160 may derive new coordinate information suitable for the screen of the receiver terminal by applying the ratio between the relative page sizes and output the received web page so that a portion of the web page corresponding to the new coordinate information is displayed on the display unit 140. As described above, the present disclosure may support a page sharing function on the basis of coordinate information when the size of the web page can be known in advance.

When tag ID information is contained as position information, the control unit 160 may use the tag ID information to output a desired portion of the web page on the display unit 140. For example, a piece of tag ID information is contained as position information, the control unit 160 may search source information of the web page for the tag ID information, and output a partial region of the web page containing the tag ID information on the display unit 140. When multiple pieces of tag ID information are present, the control unit 160 may locate a position enabling the multiple pieces of tag ID information to be commonly output on the display unit 140, and output a partial region of the web page corresponding to the located position on the display unit 140.

Use of tag ID information as position information may be effective when the web page is designed so that the size thereof cannot be known in advance. For example, when a web page is provided as a render tree containing source or tag information of information elements before the size thereof is known, the control unit 160 may search the render tree for the received tag ID information and output a partial region of the web page where the tag ID information is located on the display unit 140 first. In this process, the control unit 160 may receive source information of a web page from the web page providing server 400, generate a Document Object Model (DOM) tree of tags and then create a render tree to be actually drawn.

Thereafter, the control unit 160 may generate a layout for the whole web page on the basis of the render tree. When actual sizes of information elements corresponding to tag IDs are known, the control unit 160 may adjust sizes and positions of information elements in the layout on the basis of the actual size information. Here, to place the tag ID information received as position information from the sender terminal at a desired portion of the display unit 140, the control unit 160 may control display of information elements corresponding to other tag IDs. For example, to place the start position of an information element corresponding to the tag ID information received as position information at, for example, the center of the upper right corner of the display unit 140, the control unit 160 may control arrangement of information elements corresponding to nearby tag IDs. When the size of an information element corresponding to a tag ID provided as position information exceeds the size of the display unit 140, the control unit 160 may control display of the web page so that the start position of the corresponding information element is placed at, for example, the upper right corner of the display unit 140.

When the position information is provided as a search word, the control unit 160 may load the web page, output a partial region of the web page set by default on the display unit 140, find a partial region of the web page containing the search word, and perform movement to the found partial region of the web page so that the partial region of the web page containing the search word is output on the display unit 140. Here, the control unit 160 may perform the above process in the background and directly output the partial region of the web page containing the search word on the display unit 140. Capture information provided as position information may be handled in a manner similar to the case of a search word. That is, the control unit 160 may output a partial region of the web page of the web page set by default on the display unit 140, find a partial region of the web page containing a block matching the capture information provided as position information, and output a partial region of the web page containing the matching block on the display unit 140.

In the event that screen orientation information is contained in position information, the control unit 160 adjusts the start position of a partial region of the web page to be output according to the screen orientation information when tag ID information, coordinate information, capture information or a search word provided as part of the position information is applied to determine the partial region of the web page of the web page to be output. That is, when the start position based on the landscape mode is given by the sender terminal, the receiver terminal may also output a partial region of the web page whose start position is determined on the basis of the landscape mode.

Thereafter, at operation 615, the control unit 160 checks whether an input event for page display termination is generated. If an input event for page display termination is generated, the control unit 160 terminates page display. If an input event for page display termination is not generated, the control unit 160 returns to operation 603 and continues the procedure.

Figure 7:
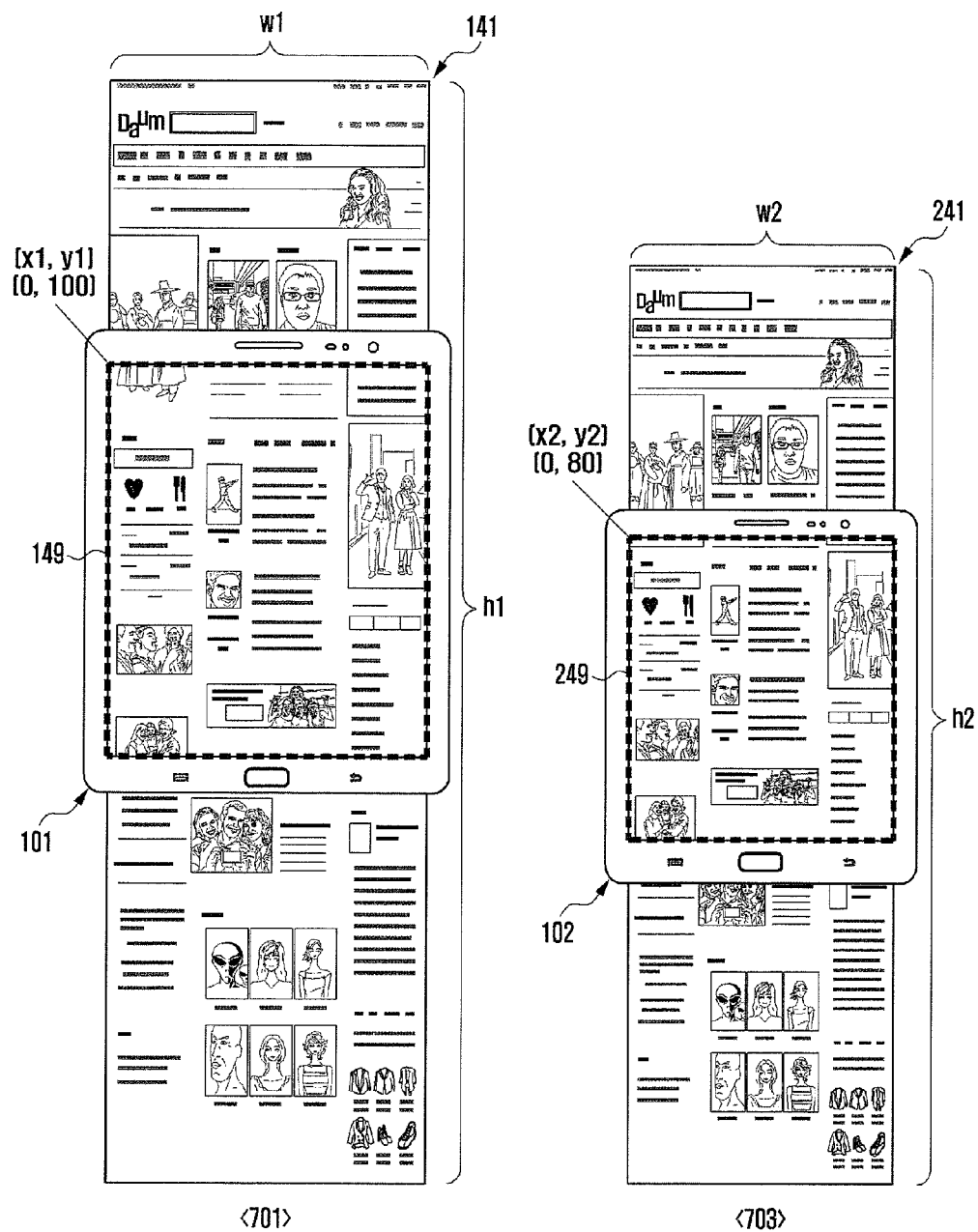
FIG. 7 illustrates screen representations for web page sharing according to an embodiment of the present disclosure.

FIG. 7 illustrates screen representations for web page sharing according to an embodiment of the present disclosure. Here, the screen representation indicated by indicia 701 is associated with a sender terminal, and the screen representation indicated by indicia 703 is associated with a receiver terminal.

Referring to FIG. 7, the sender terminal 101 may connect to the web page providing server 400 and receive a first web page 141 from the web page providing server 400 as indicated by indicia 701. The received first web page 141 may have a size larger than the screen size. In response to a navigation event, the sender terminal 101 may output a specific partial region of the web page of the first web page 141 on the display unit as shown. For example, assuming that the first web page 141 has a width w1 and a length h1, a partial region of the web page 149 whose start position is given by "x1, y1" may be output on the display unit after movement according to a navigation event.

The control unit 160 may collect information on the size of the first web page 141 (w1, h1) and information on the coordinates (x1, y1) of the start position of the partial region of the web page 149 output on the display unit as position information. Here, the coordinates (0, 100) is an example of the coordinates of the start position of the partial region of the web page 149 output on the display unit, which may change according to a navigation event. Here, the upper left corner of the display unit is used as the start position of the output partial region of the web page 149. However, the present disclosure is not limited thereto. For example, other positions such as the upper right corner, lower right corner, lower left corner or the center of the display unit may be used as the start position of the output partial region of the web page 149. The sender terminal 101 and the receiver terminal 102 may agree upon the coordinates of the start position in advance.

A plurality of information elements are contained in the output partial region of the web page 149 of the first web page 141. Each information element may have a unique tag ID. As described before, the control unit 160 of the sender terminal 101, which refers to the render tree to output the partial region of the web page 149, may obtain information on tag IDs of the information elements currently output on the display unit. Hence, the control unit 160 may collect tag ID information of at least one information element contained in the output partial region of the web page 149 of the first web page 141 as position information. When a text information element is contained in the output partial region of the web page 149 of the first web page 141, the control unit 160 may extract a text fragment from the text information element as position information.

For a receiver-side function, when unique address information of a web page and position information thereat are received from the sender terminal 101, the control unit 160 of the receiver terminal 102 may connect to the web page providing server 400 using the unique address information and receive a second web page 241 corresponding to the unique address information. Here, the first web page 141 and the second web page 241 may be identical in content but different in size.

The receiver terminal 102 may provide screen size information to the web page providing server 400 when accessing the web page providing server 400 to receive a web page. The web page providing server 400 may provide the sender terminal 101 with a second web page 241 whose size corresponds to the screen size of the receiver terminal 102. That is, the second web page 241 may have a width and length different from those of the first web page 141. In the event that the sender terminal 101 and the receiver terminal 102 have the same screen size and operate under identical display conditions, the first web page 141 and the second web page 241 may have the same size.

The control unit 160 may derive coordinate information of the start position of a partial region of the web page of the second web page 241 to be output on the display unit by applying the width ratio between the first web page 141 and the second web page 241 and the length ratio between the first web page 141 and the second web page 241 to the received position information. That is, the control unit 160 may derive coordinate information of the start position to be output on the display unit of the receiver terminal 102 using the following equations.

$$w1:w2=x1:x2 \quad \text{[Equation 1]}$$

$$h1:h2=y1:y2 \quad \text{[Equation 2]}$$

$$x2=[x1*w2]/w1 \quad \text{[Equation 3]}$$

$$y2=[y1*h2]/h1 \quad \text{[Equation 4]}$$

In the above equations, w2 and h2 indicate the width and length of the second web page 241, x2 and y2 are coordinate information of the start position of a partial region of the web page to be output on the display unit of the receiver terminal 102, and w1 and h1 indicate the width and length of the first web page 141.

After obtaining the coordinate information using the above equations, the control unit 160 outputs the second web page 241 so that a partial region of the web page 249 starting from the coordinates (x2, y2) is displayed on the display unit. In FIG. 7, the coordinates of the start position in the partial region of the web page 249 of the second web page 241 are computed to be (0, 80) and are different from those in the first web page 141. The coordinates of the start position in the output partial region of the web page 249 may vary according to screen sizes.

Meanwhile, when information on a tag ID contained in the partial region of the web page 149 of the first web page 141 is sent by the sender terminal 101, the control unit 160 may receive a second web page 241, locate an information element corresponding to the tag ID information from the source information of the second web page 241, and output a partial region of the web page 249 of the second web page 241 containing the located information element on the display unit. In addition, when a text fragment is provided, the control unit 160 may output a partial region of the web page of the second web page 241 set by default, locate a partial region of the web page 249 containing the text fragment in the second web page 241, and perform screen movement so that the located partial region of the web page 249 is output on the display unit.

FIG. 8 illustrates additional screen representations for web page sharing according to an embodiment of the present disclosure. Here, the screen representation indicated by indicia 801 is associated with a sender-side function, and the screen representations indicated by indicia 803 and 805 are associated with a receiver-side function.

Referring to FIG. 8, for web page sharing, when the sender terminal 101 connects to the web page providing server 400, the web page providing server 400 may send a first web page 141 to the sender terminal 101 as indicated by indicia 801. Then, the sender terminal 101 may output a partial region of the web page of the received first web page 141 set by default on the display unit.

Thereafter, in response to generation of an input event such as a navigation function key, the sender terminal 101 may output a partial region of the web page 149 located at the lower right corner of the first web page 141 on the display unit. When an input event for page sharing is generated by the user, the sender terminal 101 may obtain information on the position of the partial region of the web page 149 and information on the unique address of the first web page 141. Here, the sender terminal 101 may use the coordinates of the upper right corner of the partial region of the web page 149 (x1, y1) as the start position of the partial region of the web page 149.

In particular, the sender terminal 101 may collect position information (x1, y1) in the landscape display mode. After collection of the position information and unique address information, the sender terminal 101 may send the position information and unique address information to the receiver terminal 102. The sender terminal 101 may output a menu item or icon for selecting the page sharing function on the screen indicated by indicia 801 or separately output the same on the display unit according to an input event.

When the sender terminal 101 sends unique address information of a first web page 141 and position information thereat, the receiver terminal 102 parses the unique address information first among the received information. The receiver terminal 102 may connect to the web page providing server 400 using the parsed unique address information and receive a second web page 241, which is adapted to the screen size and corresponds to the unique address information, as indicated by indicia 803. Here, the receiver terminal 102 may derive new position information (x2, y2) by applying the width ratio and length ratio between the first web page 141 and second web page 241 to the position information received from the sender terminal 101 in the same manner described in FIG. 7.

The receiver terminal 102 outputs a partial region of the web page 249 of the second web page 241 corresponding to the position information (x2, y2) on the display unit. Here, regardless of the position information (x1, y1) sent by the sender terminal 101 operating in the landscape mode, the receiver terminal 102 may output the partial region of the web page 249 in the portrait mode on the basis of the position information (x2, y2) as indicated by indicia 803. Here, as an empty region without content is excluded from the displayable area of the second web page 241, an error may occur during display of the partial region of the web page 249. That is, the receiver terminal 102 may output the partial region of the web page 249 including an empty portion.

Hence, when the partial region of the web page 249 includes an empty portion or a portion outside the boundary of the second web page 241, the receiver terminal 102 may automatically adjust the partial region of the web page 249. That is, the receiver terminal 102 may adjust the partial region of the web page 249 so that the partial region of the web page 249 is included in the boundary of the second web page 241 while the position (x2, y2) is contained in the partial region of the web page 249. For example, as indicated by indicia 805, the receiver terminal 102 may adjust the position of the partial region of the web page 249 by changing the value of y2.

Although not shown, the sender terminal 101 may obtain information on the screen orientation such as portrait mode or landscape mode and provide the screen orientation information together with other position information (x1, y1) to the receiver terminal 102. Then, the receiver terminal 102 may output a notification indicating screen orientation change when the partial region of the web page 249 is positioned according to the position information (x2, y2) or may automatically arrange the partial region of the web page 249 so that the orientation of the partial region of the web page 249 is identical to that of the partial region of the web page 149 without separate notification.

The sender terminal 101 may subdivide the screen indicated by indicia 801 into multiple blocks in a matrix form, capture at least one block, and provide the capture information as position information to the receiver terminal 102. Here, the sender terminal 101 may also provide information on the subdivided blocks to the receiver terminal 102. Then, the receiver terminal 102 may subdivide the second web page 241 into multiple blocks according to the received subdivision information, find a block matching the received capture information, and output a partial region of the web page containing the block matching the capture information on the display unit.

The sender terminal 101 may send at least one of coordinate information, text phrase information and capture information as part of position information. Then, the receiver terminal 102 may identify at least one of coordinate information, text phrase information and capture information as position information, and output a partial region of the web page of the second web page corresponding to the identified position information on the display unit.

FIG. 9 illustrates further screen representations for web page sharing according to an embodiment of the present disclosure. Here, the screen representation indicated by indicia 901 may be associated with a sender terminal, and the screen representation indicated by indicia 903 may be associated with a receiver terminal. Conversely, the screen representation indicated by indicia 901 may be associated with a receiver terminal, and the screen representation indicated by indicia 903 may be associated with a sender terminal.

Referring to FIG. 9, assume that the sender terminal 101 has a relatively large screen size and can display a page designed for a personal computer (PC). Then, the first web page 141 indicated by indicia 901 may be a PC version page. That is, the sender terminal 101 may be a large screen terminal capable of displaying PC version pages, such as a tablet computer, large-screen PDA, large-screen laptop computer, slate PC or large-screen mobile terminal.

As indicated by indicia 901, the sender terminal 101 may output a partial region of the web page 149 of the first web page 141. In response to generation of an input event for page sharing, the sender terminal 101 may obtain information on the size of the whole first web page 141 (300, 450) and coordinate information of the start position of the partial region of the web page 149 (80, 100) as position information. Thereafter, the sender terminal 101 may send the position information and unique address information of the first web page 141 to the receiver terminal 102.

The receiver terminal 102 may parse the unique address information among the received information and receive a second web page 241 of a mobile version from the web page providing server 400. The receiver terminal 102 may derive new position information, for example, (53, 80) for a partial region of the web page 249 of the second web page 241 by applying the screen size ratio to the received position information as indicated by indicia 903. The receiver terminal 102 may output the partial region of the web page 249 corresponding to the newly derived coordinate information on the display unit.

Meanwhile, a PC version page and a mobile version page may have different contents. For example, the PC version page and the mobile version page may differ in terms of advertisement or information element. Hence, the sender terminal 101 may provide both coordinate information and information on at least one tag ID contained in the partial region of the web page 149 as position information.

Then, the receiver terminal 102 may output a partial region of the web page 249 of the second web page 241 on the basis of the received coordinate information, and output a sharing error message when an information element corresponding to the received tag ID information is not present. Alternatively, the receiver terminal 102 may output a partial region of the web page containing an information element corresponding to the received tag ID information in disregard of the received coordinate information.

In the above description, web pages are classified as a PC version and a mobile version. However, the present disclosure is not limited thereto. That is, a PC version page may be a monitor version for a smart TV or a projector version for a projector. Hence, a PC version page and a mobile version page may be regarded as a first version page and a second version page that have the same address information and are adapted for terminals of different types. In this respect, the web page providing server 400 may generate and distribute various versions of web pages having the same address information.

As described hereinabove, the page sharing function according to an embodiment of the present disclosure may be provided as a function of a browser installed in a mobile terminal. Hence, users may easily execute the page sharing function during usage of browsers to thereby share a specific webpage in an intuitive and rapid manner.

Meanwhile, the mobile terminal 100 may further include various components according to design. For example, when the mobile terminal 100 is a communication terminal, the mobile terminal 100 may further include a local area communication module for local area communication, a data communication interface based on wired and wireless communication, an Internet communication module for Internet access and communication, and a digital broadcast reception module for receiving and playing digital broadcasts. Although possible variations according to the trend of digital convergence are too numerous to enumerate, it should be apparent to those skilled in the art that the mobile terminal 100 may further include a unit comparable to the above-described units, and one unit of the mobile terminal 100 may be removed or replaced with another unit.

The mobile terminal 100 of the present disclosure may be any information and communication appliance or multimedia appliance, such as a mobile communication terminal based on communication protocols supporting various communication systems, a portable multimedia player (PMP), a digital broadcast receiver, a personal digital assistant (PDA), a music player like an MP3 player, a portable game console, a smartphone, a laptop computer, or a handheld computer.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal, comprising:
a communication unit configured to receive data on a web page from a network according to a first input;
a display unit configured to display a partial region of the received web page in a landscape mode or a portrait mode on a screen; and
a control unit configured to:
collect information on a size of the web page and coordinate information of the partial region of the web page;
generate a virtual anchor for displaying the partial region of the web page;
in response to a second input for sharing the partial region of the web page with another terminal, obtain an address of the web page, position information on the partial region currently being displayed on the display unit and display orientation information indicating whether the web page is currently displayed with the landscape mode or the portrait mode; and
cause the communication unit to send the address, the position information, and the display orientation information to the other terminal.

2. The mobile terminal of claim 1, wherein the control unit is configured to collect tag ID information of an information element arranged at a topmost portion of the web page and coordinate information of a position in the partial region of the web page on the display unit as the position information.

3. The mobile terminal of claim 1, wherein the control unit is configured to collect tag ID information included in the partial region of the web page as the position information.

4. The mobile terminal of claim 3, wherein the control unit is configured to collect tag ID information associated with an information element specified by an input event among multiple information elements contained in the partial region of the web page as the position information.

5. The mobile terminal of claim 1, wherein the control unit is configured to extract at least a portion of text data contained in the partial region of the web page as a search key word.

6. The mobile terminal of claim 1, wherein the control unit is configured to collect capture information on the partial region of the web page as the position information.

7. A mobile terminal for sharing a part of a web page, comprising:
a communication unit configured to receive address information of the web page, position information on a partial region of a first web page, and display orientation information indicating whether the web page is currently displayed on another mobile terminal with a landscape mode or a portrait mode from the other mobile terminal,
wherein the partial region is currently being displayed on a display of the other mobile terminal when the other mobile terminal obtains the position information on the partial region, and
wherein the received position information includes a size of the web page and coordinate information of the partial region of the web page;
a control unit configured to:
collect information on a size of the web page and coordinate information of the partial region of the web page;
control the communication unit to access the web page by utilizing the address information; and
determine the partial region to display, of the web page and a display mode between the landscape mode and the portrait mode by utilizing the position information and the display orientation information;
generate a virtual anchor for displaying the partial region of the web page; and
a display unit configured to display the partial region of the web page in the determined display mode.

8. The mobile terminal of claim 7, wherein the control unit is configured to display the partial region on the display unit by applying a ratio between a size of the first web page and the size of a second web page to the coordinate information.

9. The mobile terminal of claim 7, wherein, when the received position information contains tag ID information contained in a region to display, the control unit is configured to searches the web page for the tag ID information and cause the display unit to display the partial region containing an information element associated with the tag ID information on the display unit.

10. The mobile terminal of claim 7, wherein, when the received position information includes at least a portion of text information, the control unit is configured to cause the display unit to display the partial region containing the portion of text information.

11. The mobile terminal of claim 7, wherein, when the received position information includes capture information of the partial region of the web page, the control unit is configured to display the partial region matching the capture information on the display unit.

12. A method for sharing a part of a web page in a mobile terminal, comprising:
receiving a web page according to a first input;
displaying a partial region of the web page of the received web page in a landscape mode or a portrait mode;
collecting information on a size of the web page and coordinate information of the partial region of the web page;
generating a virtual anchor for displaying the partial region of the web page;
in response to a second input for sharing the partial region of the web page with another terminal, collecting address information of the web page, position information on the partial region of the web page that is currently being displayed on a display unit and display orientation information indicating whether the web page is currently displayed with the landscape mode or the portrait mode; and
sending the address information, position information and display orientation information to another terminal.

13. The method of claim 12, wherein collecting the position information comprises collecting tag ID information of an information element arranged at a topmost portion of the web page and coordinate information of a position in the partial region on a display unit as the position information.

14. The method of claim 12, wherein the position information comprises tag ID information associated with at least one information element in the partial region.

15. The method of claim 14, wherein the position information comprises tag ID information associated with an information element specified by an input event among multiple information elements contained in the partial region.

16. The method of claim 12, wherein collecting the position information further comprises at least one of:

extracting at least a portion of text information contained in the partial region of the web page as a search word for the position information; and collecting capture information of a block of the partial region of the web page as the position information.

17. A method for sharing a part of a web page, comprising:

receiving address information on a web page, position information on a partial region of the web page and display orientation information indicating whether the web page is currently displayed on another mobile terminal with landscape mode or a portrait mode from the other mobile terminal, wherein the position information includes a size of the web page and coordinate information of the partial region of the web page;

determining the partial region of the web page and a display mode between the landscape mode or the portrait mode based on the address information, the position information and the display orientation information;

generating a virtual anchor for displaying the partial region of the determined web page; and displaying the determined partial region of the web page in the determined display mode, wherein the partial region is currently being displayed on a display of the other mobile terminal when the other mobile terminal obtains the position information on the partial region.

18. The method of claim 17, wherein the position information comprises information on a size of the web page and coordinate information of the partial region of the web page.

19. The method of claim 18, wherein the determined partial region of the web page is displayed by applying a ratio between sizes of the web page and a partial page to the coordinate information.

20. The method of claim 17, wherein the position information indicates a position that contains tag ID information associated with at least one information element in the partial region of the web page.

21. The method of claim 20, wherein displaying the determined partial region of the web page comprises searching the web page for the tag ID information, and displaying a partial region containing an information element associated with the tag ID information.

22. The method of claim 17, wherein the position information indicates a position that contains text information in the partial region of the web page.

23. The method of claim 22, wherein displaying the determined partial region of the web page comprises displaying the partial region of the web page containing the at least a portion of text information.

24. The method of claim 17, wherein the position information comprises capture information of the partial region.

25. The method of claim 24, wherein displaying the determined partial region of the web page comprises displaying a partial region matching the capture information.

* * * * *